United States Patent
Inomata et al.

(10) Patent No.: US 8,424,066 B2
(45) Date of Patent: Apr. 16, 2013

(54) INFORMATION PROCESSING APPARATUS, AUTHENTICATION SYSTEM, INFORMATION PROCESSING METHOD AND STORAGE MEDIUM

(75) Inventors: Kohshiro Inomata, Ebina (JP); Tadao Michimura, Ebina (JP); Hirochika Shionoiri, Ebina (JP); Masahiro Iwata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1163 days.

(21) Appl. No.: 12/329,652

(22) Filed: Dec. 8, 2008

(65) Prior Publication Data

US 2009/0300733 A1    Dec. 3, 2009

(30) Foreign Application Priority Data

May 30, 2008 (JP) ................................. 2008-143224

(51) Int. Cl.
*G06F 7/04* (2006.01)

(52) U.S. Cl.
USPC ........................................ 726/5; 726/3; 726/2

(58) Field of Classification Search .................. None
See application file for complete search history.

(56) References Cited

U.S. PATENT DOCUMENTS

| | | | |
|---|---|---|---|
| 2003/0115462 A1* | 6/2003 | Kim et al. ................ | 713/170 |
| 2005/0148342 A1* | 7/2005 | Sylvain ................... | 455/456.3 |
| 2005/0163483 A1* | 7/2005 | Rassool ................... | 380/201 |
| 2007/0003341 A1* | 1/2007 | Guan et al. ............. | 399/366 |
| 2007/0025600 A1* | 2/2007 | Ghebreyesus ........... | 382/124 |
| 2011/0211228 A1* | 9/2011 | Asahara .................. | 358/1.16 |
| 2011/0242607 A1* | 10/2011 | Shenoy et al. ......... | 358/1.15 |

FOREIGN PATENT DOCUMENTS

| | | |
|---|---|---|
| JP | 2003-303284 A | 10/2003 |
| JP | 2004-234329 A | 8/2004 |
| JP | 2004-252768 A | 9/2004 |
| JP | 2007-058487 A | 3/2007 |
| JP | 2007-102608 A | 4/2007 |
| JP | 2007-102686 A | 4/2007 |
| JP | 2007-157002 A | 6/2007 |
| JP | 2008-015934 A | 1/2008 |

OTHER PUBLICATIONS

Japanese Office Action dated Jan. 26, 2010 for Japanese Patent Application No. 2008-143224.

* cited by examiner

*Primary Examiner* — David Y Jung
(74) *Attorney, Agent, or Firm* — Sughrue Mion, PLLC (57) ABSTRACT

An information processing apparatus includes a storage unit that stores a first user identifier that identifies respective users in the information processing apparatus, and plural second user identifiers stored in respective authentication apparatuses and identify the users in each authentication apparatus, so as to correspond with each other; a first authentication request unit that transmits authentication information input by a user to at least one of the authentication apparatuses and requests authentication of the user; a first user identifier acquisition unit that, when authentication of the user has been successful, acquires the second user identifier of that user stored in that authentication apparatus; and a use allowing unit that specifies the first user identifier stored in the storage unit corresponding with the second user identifier acquired by the first user identifier acquisition unit, and allows the user identified by the specified first user identifier to use the information processing apparatus.

13 Claims, 8 Drawing Sheets

| USERNAME | PASSWORD |
|----------|----------|
| fuji | abcdef |
| tanaka | ghijk |
| ... | ... |

| USERNAME |
|----------|
| fuji.taro@ab.com |
| tanaka@ab.com |
| ... |

| USERNAME | PASSWORD |
|----------|----------|
| 1234 | bbb |
| 2222 | ccc |
| ... | ... |

| USERNAME | FINGERPRINT PATTERN | TE |
|---|---|---|
| fuji.taro | FINGERPRINT PATTERN 1 | |
| abc123 | FINGERPRINT PATTERN 2 | |
| ... | ... | |

| USERNAME | CARD ID | TF |
|---|---|---|
| 123456 | 7788 | |
| 777777 | 9876 | |
| ... | ... | |

FIG. 9

| USER ID | APPARATUS ID OF AUTHENTICATION RECIPIENT | USERNAME OF AUTHENTICATION RECIPIENT |
|---|---|---|
| 007 | ServA | fuji |
| | ServB | fuji.taro@ab.com |
| | ServC | 1234 |
| | Local1 | fuji.taro |
| | Local2 | 777777 |
| 008 | Local2 | 123456 |
| | Local1 | abc123 |
| 009 | ServC | 2222 |
| ... | ... | ... |

| USER ID | PERSONAL DATA | | | | |
|---|---|---|---|---|---|
| | SCREEN CUSTOMIZING INFORMATION | OPERATION HISTORY INFORMATION | ADDRESS BOOK INFORMATION | IMAGE DATA | ... |
| 007 | CU007 | OP007 | AD007 | IM007-1 | ... |
| 008 | — | OP008 | — | — | ... |
| 009 | CU009 | OP009 | — | IM009-1 IM009-2 | ... |
| ... | ... | ... | ... | ... | ... |

| USER ID | APPARATUS ID OF AUTHENTICATION RECIPIENT | USERNAME OF AUTHENTICATION RECIPIENT |
|---|---|---|
| 007 | ServA | fuji |
| | ServB | fuji.taro@ab.com |
| | ServC | 1234 |
| | Local1 | fuji.taro |
| | Local2 | 777777 |
| 008 | Local2 | 123456 |
| | Local1 | abc123 |
| 009 | ServC | 2222 |
| 010 | ServA | tanaka |
| ... | ... | ... |

*FIG. 15*

| USER ID | APPARATUS ID OF AUTHENTICATION RECIPIENT | USERNAME OF AUTHENTICATION RECIPIENT |
|---|---|---|
| 007 | ServA | fuji |
| | ServB | fuji.taro@ab.com |
| | ServC | 1234 |
| | Local1 | fuji.taro |
| | Local2 | 777777 |
| 008 | Local2 | 123456 |
| | Local1 | abc123 |
| | ServA | tanaka |
| 009 | ServC | 2222 |
| ... | ... | ... |

INFORMATION PROCESSING APPARATUS, AUTHENTICATION SYSTEM, INFORMATION PROCESSING METHOD AND STORAGE MEDIUM

CROSS-REFERENCE TO RELATED APPLICATIONS

This application claims priority under 35 USC 119 from a Japanese patent application No. 2008-143224 filed on May 30, 2008.

BACKGROUND

1. Technical Field

The present invention relates to an information processing apparatus, an authentication system, and a program.

2. Related Art

Technology is known in which user authentication is performed using an authentication apparatus that has been selected by a user from among a multiple authentication apparatuses.

SUMMARY

The present invention provides to use any of multiple authentication apparatuses to authenticate a user, and to uniquely specify a user that used an apparatus via that authentication.

According to one aspect of the invention, there is provided an information processing apparatus, including: a correspondence storage unit that stores a first user identifier that identifies respective users in the information processing apparatus, and a plurality of second user identifiers that are stored in respective authentication apparatuses and identify the users in each authentication apparatus, so as to correspond with each other; a first authentication request unit that transmits authentication information that has been input by a user to at least one of the authentication apparatuses and requests authentication of the user; a first user identifier acquisition unit that, when authentication of the user by the authentication apparatus has been successful, acquires the second user identifier of that user that is stored in that authentication apparatus; and a use allowing unit that specifies the first user identifier stored in the correspondence storage unit corresponding with the second user identifier that has been acquired by the first user identifier acquisition unit, and allows the user that is identified by the specified first user identifier to use the information processing apparatus.

BRIEF DESCRIPTION OF THE DRAWINGS

Exemplary embodiment(s) of the present invention will be described in detail based on the following figures, wherein.

DETAILED DESCRIPTION

1. Configuration

Figure 1:
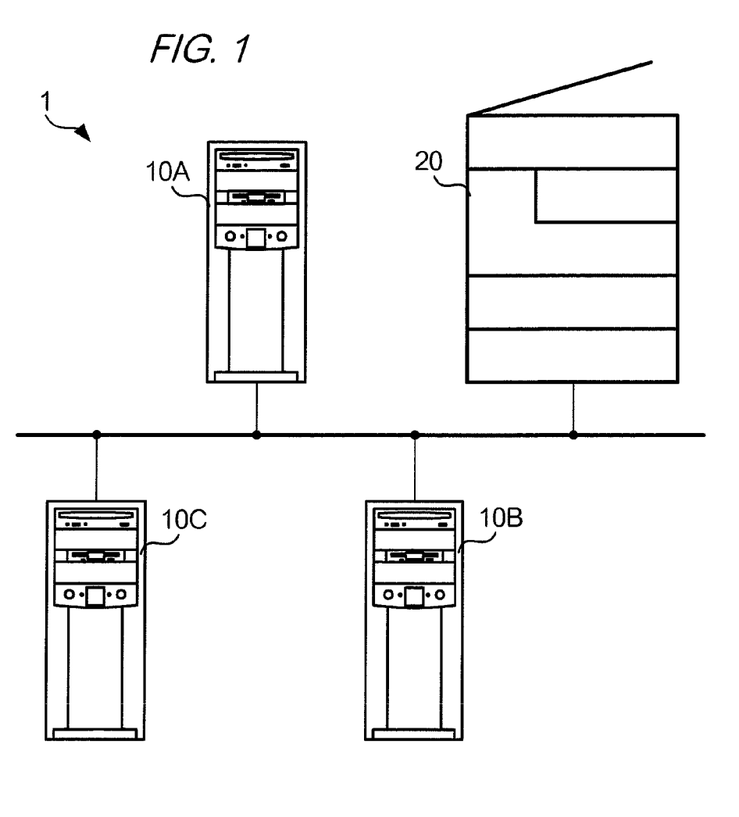
FIG. 1 shows the configuration of an authentication system according to the present exemplary embodiment.

FIG. 1 shows the configuration of an authentication system 1 according to the present exemplary embodiment. As shown in FIG. 1, the authentication system 1 is provided with authentication server apparatuses 10A, 10B, and 10C, and an image forming apparatus 20. The authentication server apparatuses 10A, 10B, and 10C, and the image forming apparatus 20, are connected to each other via a network such as a LAN (Local Area Network). The authentication server apparatuses 10A, 10B, and 10C are an example of authentication apparatuses that perform authentication of users that respectively use different services. For example, the authentication server apparatus 10A performs authentication of all users that use an unshown information processing terminal, the authentication server apparatus 10B performs authentication of a user that uses an electronic mail function among users that use an unshown information processing terminal, and the authentication server apparatus 10C performs authentication of a user that belongs to a specific group among users that use an unshown information processing terminal. Note that in the description below, when it is not necessary to distinguish between the authentication server apparatuses 10A, 10B, and 10C, they are collectively referred to as the 'authentication server apparatus 10'.

1-1. Configuration of Authentication Server Apparatus

Figure 2:
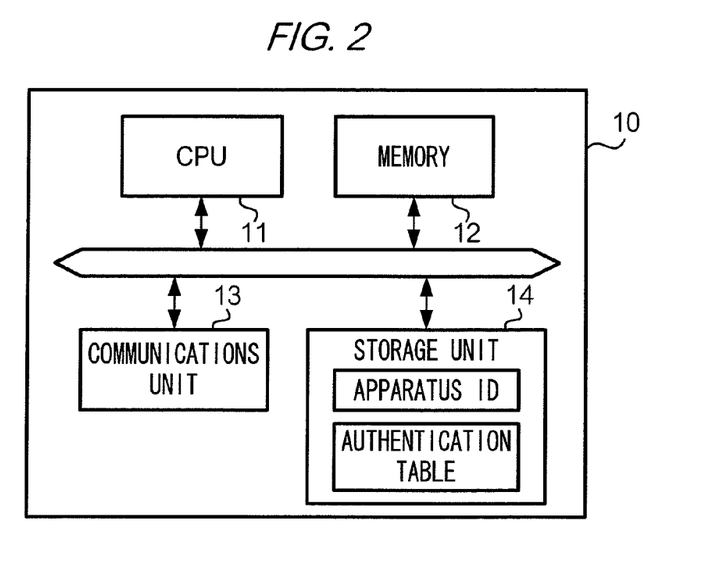
FIG. 2 is a block diagram that shows the configuration of an authentication server apparatus of the authentication system.

First is a description of the configuration of the authentication server apparatuses 10A, 10B, and 10C. The authentication server apparatuses 10A, 10B, and 10C are each provided with the same configuration. FIG. 2 is a block diagram that shows the configuration of the authentication server apparatus 10. As shown in FIG. 2, the authentication server apparatus 10 is provided with a CPU (Central Processing Unit) 11, a memory 12, a communications unit 13 that is an example of a transmission unit, and a storage unit 14 that is an example of a user identifier storage unit. The CPU 11 performs various processing according to programs stored in the memory 12. The memory 12 is provided with, for example, a ROM (Read Only Memory), a RAM (Random Access Memory), or the like, and stores programs or the like used by the CPU 11. The communications unit 13 establishes communications with the image forming apparatus 20 connected via the network, and sends/receives data according to control of the CPU 11. The storage unit 14 is, for example, a hard disk, and stores an apparatus ID, an authentication table, and the like. Note that in the description below, when distinguishing the respective configurations of the authentication server apparatuses 10A, 10B, and 10C, the letters 'A', 'B', or 'C' are added.

Here is a description of the contents of an apparatus ID and an authentication table that are stored in the storage unit 14. The apparatus ID is an apparatus identifier for identifying respective authentication apparatuses that perform authentication of a user, and is allocated in advance to respective authentication server apparatuses 10. For example, a communications address, apparatus name, authentication system, or the like of the authentication server apparatus 10 is used as this apparatus ID. Here, an apparatus ID 'ServA' is stored in the storage unit 14A of the authentication server apparatus 10A, an apparatus ID 'ServB' is stored in the storage unit 14B of the authentication server apparatus 10B, and an apparatus ID 'ServC' is stored in the storage unit 14C of the authentication server apparatus 10C.

Figure 3A:
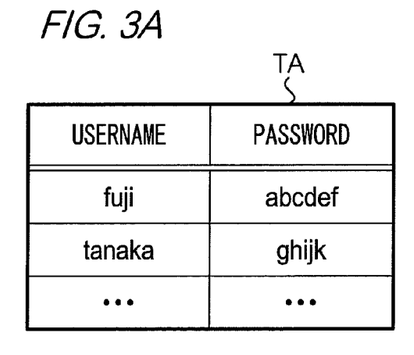
FIGS. 3A to 3C show an example of an authentication table stored by the authentication server apparatus.

Authentication information of respective users that are authenticated by the authentication server apparatus 10 is described in the authentication table. Here, an authentication table TA is stored in the storage unit 14A of the authentication server apparatus 10A, an authentication table TB is stored in the storage unit 14B of the authentication server apparatus 10B, and an authentication table TC is stored in the storage unit 14C of the authentication server apparatus 10C. FIG. 3A shows an example of the authentication table TA stored in the storage unit 14A of the authentication server apparatus 10A. As shown in FIG. 3A, 'username' and 'password' are described so as to correspond with each other in the authentication table TA. In this case, username and password are used as authentication information in the authentication server apparatus 10A. A 'username' is a user identifier for identifying respective users that are authenticated by the authentication server apparatus 10A, and is allocated in advance to respective users. Also, a 'password' is a string of numbers or text that has been designated in advance by a user, and is used for confirming that a user is a particular person. For example, in the authentication table TA shown in FIG. 3A, the username 'fuji' and the password 'abcdef' correspond with each other. This indicates that the user with the username 'fuji' is a valid user that is authenticated by the authentication server apparatus 10A, and the password of that user is 'abcdef'.

Figure 3B:
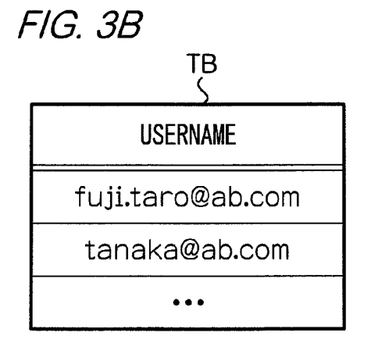
Figure 3C:
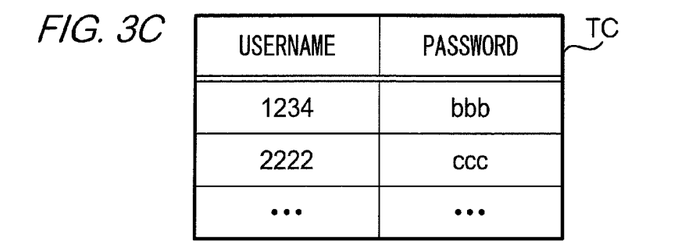

FIG. 3B shows an example of the authentication table TB stored in the storage unit 14B of the authentication server apparatus 10B. As shown in FIG. 3B, the 'username' of respective users authenticated by the authentication server apparatus 10B is described in the authentication table TB. In this case, the username is used as authentication information in the authentication server apparatus 10B. For example, in the authentication table TB shown in FIG. 3B, the username 'fuji.taro@ab.com' is described. This indicates that the user with the username 'fuji.taro@ab.com' is a valid user that is authenticated by the authentication server apparatus 10B. FIG. 3C shows an example of the authentication table TC stored in the storage unit 14C of the authentication server apparatus 10C. As shown in FIG. 3C, the 'username' and 'password' of respective users that are authenticated by the authentication server apparatus 10C are described so as to correspond with each other in the authentication table TC. In this case, the username and password are used as authentication information in the authentication server apparatus 10C. For example, in the authentication table TC shown in FIG. 3C, the username '1234' and the password 'bbb' correspond with each other. This indicates that the user with the username '1234' is a valid user that is authenticated by the authentication server apparatus 10C, and the password of that user is 'bbb'.

1-2. Configuration of Image Forming Apparatus

Figure 4:
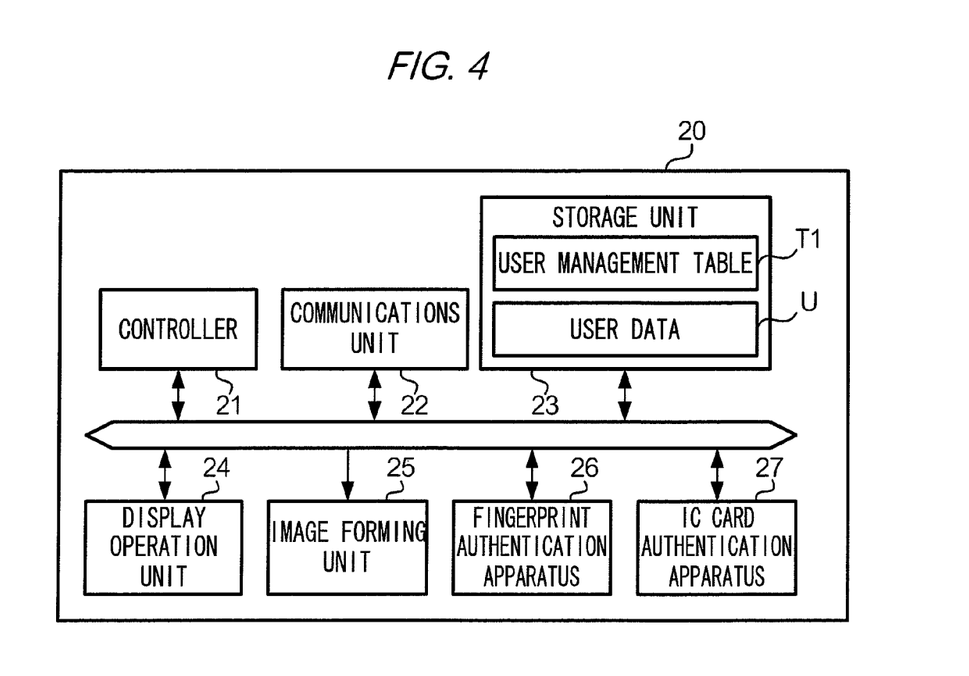
FIG. 4 is a block diagram that shows the configuration of an image forming apparatus of the authentication system.

Next is a description of the configuration of the image forming apparatus 20. FIG. 4 is a block diagram that shows the configuration of the image forming apparatus 20. As shown in FIG. 4, the image forming apparatus 20 is provided with a controller 21, a communications unit 22, a storage unit 23 that is an example of a correspondence storage unit, a data storage unit, and an apparatus identifier storage unit, a display operation unit 24, an image forming unit 25, a fingerprint authentication apparatus 26, and an IC card authentication apparatus 27. Here, the configuration in the image forming apparatus 20, with the exception of the fingerprint authentication apparatus 26 and the IC card authentication apparatus 27, is an example of an information processing apparatus. The controller 21 is provided with a CPU that performs processing according to a program, a ROM that stores the program, a RAM that is used as a work area of the CPU, and the like, for example, and controls each part of the image forming apparatus 20. The communications unit 22 establishes communications with the respective authentication server apparatuses 10 that have been connected via the network, and sends/receives data according to control of the controller 21. The storage unit 23 is, for example, a hard disk, and stores a user management table T1, user data U, and the like. The display operation unit 24 is provided with a touch panel or the like, for example, and along with displaying an image that has been designated by the controller 21, supplies an operation signal corresponding to operation by an operator to the controller 21. The image forming unit 25 is, for example, a printer apparatus, and forms an image corresponding to image data that has been supplied by the controller 21 to paper.

Figure 5:
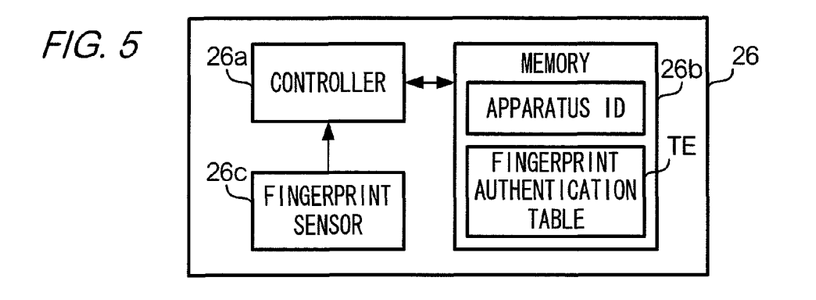
FIG. 5 shows the configuration of a fingerprint authentication apparatus of the image forming apparatus.
Figure 6:
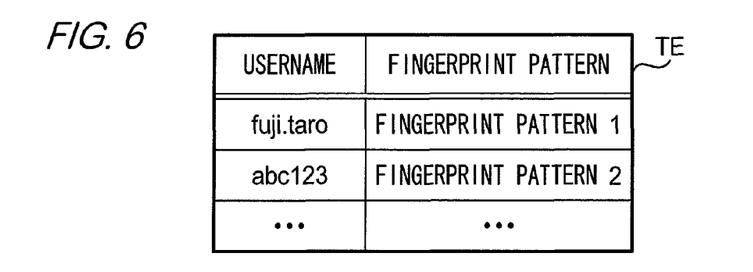
FIG. 6 shows an example of a fingerprint authentication table stored by the fingerprint authentication apparatus.

The fingerprint authentication apparatus 26 is an example of an authentication apparatus that performs authentication of a user by using the fingerprint pattern of the user. FIG. 5 shows the configuration of the fingerprint authentication apparatus 26. As shown in FIG. 5, the fingerprint authentication apparatus 26 is provided with a controller 26a that controls each part of the fingerprint authentication apparatus 26, a memory 26b that is an example of a user identifier storage unit, and a fingerprint sensor 26c that reads a fingerprint. An apparatus ID 'Local1' that has been allocated to the fingerprint authentication apparatus 26, a fingerprint authentication table TE, and the like are stored in the memory 26b. As in the authentication tables TA to TC, authentication information of respective users that are authenticated by the fingerprint authentication apparatus 26 is described in the fingerprint authentication table TE. FIG. 6 shows an example of the fingerprint authentication table TE. As shown in FIG. 6, the 'username' and 'fingerprint pattern' of respective users that are authenticated by the fingerprint authentication apparatus 26 are described so as to correspond with each other in the fingerprint authentication table TE. In this case, the username and fingerprint pattern are used as authentication information in the fingerprint authentication apparatus 26. The 'fingerprint pattern' is information that expresses features of a fingerprint of a user. For example, in the fingerprint authentication table TE shown in FIG. 6, the username 'fuji.taro' and a 'fingerprint pattern 1' correspond with each other. This indicates that the user with the username 'fuji.taro' is a valid user that is authenticated by the fingerprint authentication apparatus 26, and the fingerprint pattern of that user is 'fingerprint pattern 1'.

Figure 7:
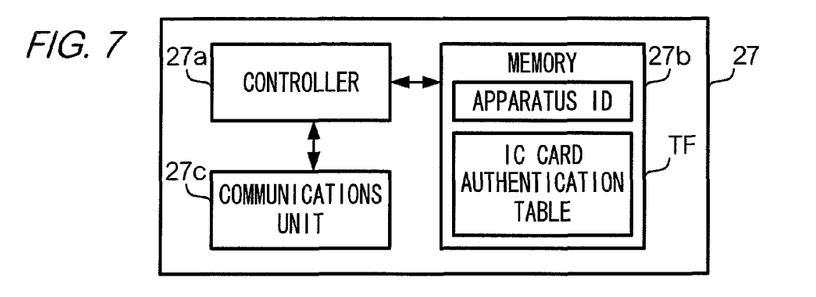
FIG. 7 shows the configuration of an IC card authentication apparatus of the image forming apparatus.
Figure 8:
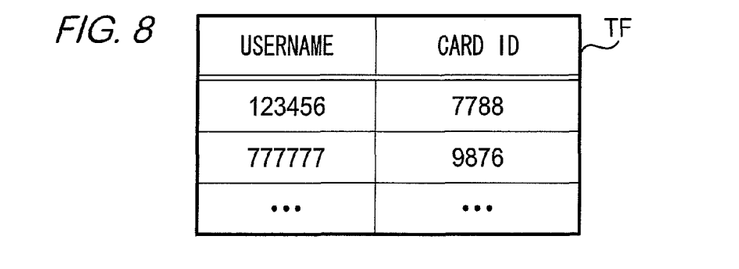
FIG. 8 shows an example of an IC card authentication table stored by the IC card authentication apparatus.

Here, the IC card authentication apparatus 27 is an example of an authentication apparatus that performs authentication of a user with an IC card possessed by the user. FIG. 7 shows the configuration of the IC card authentication apparatus 27. As shown in FIG. 7, the IC card authentication apparatus 27 is provided with a controller 27a that controls each part of the IC card authentication apparatus 27, a memory 27b that is an example of a user identifier storage unit, a communications unit 27c that reads authentication information stored on the IC card, and the like. An apparatus ID 'Local2' that has been allocated to the IC card authentication apparatus 27, an IC card authentication table TF, and the like are stored in the memory 27b. As in the authentication tables TA to TC, authentication information of respective users that are authenticated by the IC card authentication apparatus 27 is described in the IC card authentication table TF. FIG. 8 shows an example of the IC card authentication table TF. As shown in FIG. 8, a 'username' and 'card ID' of respective users that are authenticated by the IC card authentication apparatus 27 are described so as to correspond with each other in the IC card authentication table TF. In this case, the username and card ID are used as authentication information in the IC card authentication apparatus 27. The 'card ID' is a card identifier for identifying respective IC cards. For example, a card number, a security number, or the like is used as this 'card ID'. For example, in the IC card authentication table TF shown in FIG. 8, the username '123456' and the card ID '7788' correspond with each other. This indicates that the user with the username '123456' is a valid user that is authenticated by the IC card authentication apparatus 27, and the card ID of the IC card used by that user is '7788'.

Figure 9:
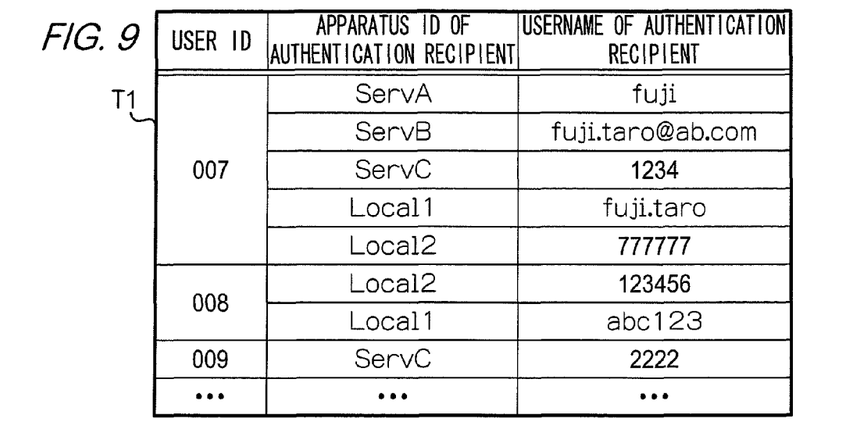
FIG. 9 shows an example of a user management table stored by the image forming apparatus.

Here is a description of the contents of the user management table T1 and the user data U that are stored in the storage unit 23. FIG. 9 shows an example of the user management table T1. As shown in FIG. 9, a 'user ID', an 'apparatus ID' of an authentication recipient, and a 'username' of the authentication recipient are described so as to correspond with each other in the user management table T1. The 'user ID' is an example of a first user identifier for identifying, in the image forming apparatus 20, respective users that have been allowed to use the image forming apparatus 20. The 'apparatus ID' of the authentication recipient is an example of an apparatus identifier for identifying respective authentication apparatuses that have been determined in advance as valid authentication apparatuses. The 'username' of the authentication recipient is stored in the respective authentication apparatuses, and is an example of a second user identifier for identifying a user in the authentication apparatus. In this user management table T1, when a new user that has been authenticated by an authentication apparatus uses the image forming apparatus 20, the 'user ID', the 'apparatus ID' of an authentication recipient, and the 'username' of the authentication recipient are added. Note that in the description below, adding a new 'user ID' to the user management table T1 is referred to as 'user registration'.

For example, in the user management table T1 shown in FIG. 9, the user ID '007' corresponds with the authentication recipient apparatus ID 'ServA' and the authentication recipient username 'fuji', the authentication recipient apparatus ID 'ServB' and the authentication recipient username 'fuji.taro@ab.com', the authentication recipient apparatus ID 'ServC' and the authentication recipient username '1234', the authentication recipient apparatus ID 'Local1' and the authentication recipient username 'fuji.taro', and the authentication recipient apparatus ID 'Local2' and the authentication recipient username '777777'. This indicates that the user with the user ID '007', the user with the username 'fuji' that is authenticated by the authentication server apparatus 10A with the apparatus ID 'ServA', the user with the username 'fuji.taro@ab.com' that is authenticated by the authentication server apparatus 10B with the apparatus ID 'ServB', the user with the username '1234' that is authenticated by the authentication server apparatus 10C with the apparatus ID 'ServC', the user with the username 'fuji.taro' that is authenticated by the fingerprint authentication apparatus 26 with the apparatus ID 'Local1', and the user with the username '777777' that is authenticated by the IC card authentication apparatus 27 with the apparatus ID 'Local2' are all the same user.

Figure 10:
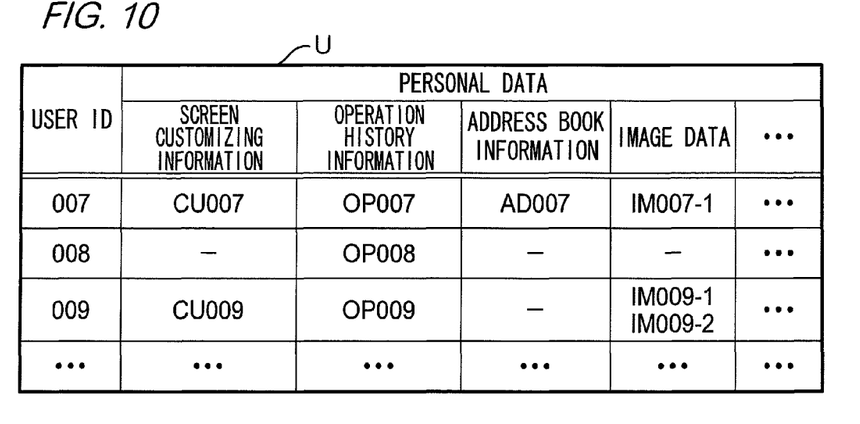
FIG. 10 shows an example of user data stored by the image forming apparatus.

FIG. 10 shows an example of the user data U. As shown in FIG. 10, the 'user ID' included in the user management table T1 and 'personal data' that is data of a user that is identified by that 'user ID' are described so as to correspond with each other in the user data U. This 'personal data' includes 'screen customizing information' that indicates settings of a screen that has been customized by respective users, 'operation history information' that indicates an operation history of the display operation unit 24 by respective users, 'address book information' that indicates a transmission recipient of data that has been designated in advance by respective users, and 'image data' that has been stored by respective users. For example, in the user data U shown in FIG. 10, the user ID '007', screen customizing information 'CU007', operation history information 'OP007', address book information 'AD007', and image data 'IM007-1' correspond with each other. This indicates that the screen customizing information 'CU007', the operation history information 'OP007', the address book information 'AD007', and the image data 'IM007-1' are all data of the user with the user ID '007'.

Figure 11:
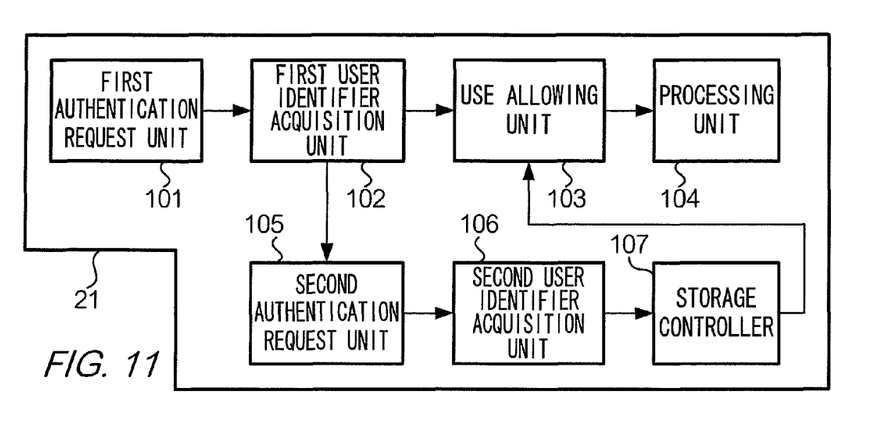
FIG. 11 shows the functional configuration of the image forming apparatus.

Here is a description of each function of the controller 21. FIG. 11 shows the functional configuration of the controller 21. As shown in FIG. 11, the controller 21, as its functional configuration, is provided with a first authentication request unit 101, a first user identifier acquisition unit 102, a use allowing unit 103, a processing unit 104, a second authentication request unit 105, a second user identifier acquisition unit 106, and a storage controller 107. Each of these functions is realized by the CPU of the controller 21 executing a program. The first authentication request unit 101 is an example of a first authentication request unit that transmits authentication information that has been input by a user to an authentication apparatus and requests authentication of the user. For example, a username, a username and password, a username and fingerprint pattern, or a username and card ID is used as this authentication information. The first user identifier acquisition unit 102, is an example of a first user identifier acquisition unit that, when authentication of the user by the authentication apparatus has been successful, acquires a second user identifier of that user that is stored in the apparatus that performed user authentication. For example, a username stored in the authentication apparatus is used as this second user identifier. The use allowing unit 103 is an example of a use allowing unit that specifies the first user identifier stored in the storage unit 23 corresponding with the second user identifier that has been acquired by the first user identifier acquisition unit 102, and allows the user that is identified by the specified first user identifier to use the image forming apparatus 20. For example, a user ID described in the user management table T1 is used as this first user identifier. The processing unit 104 is an example of a processing unit that, when use of the image forming apparatus 20 has been allowed by the use allowing unit 103, performs processing using data stored in the storage unit 23 corresponding with the first user identifier that has been specified by the use allowing unit 103.

The second authentication request unit 105 is an example of a second authentication request unit that, when the second user identifier that has been acquired by the first user identifier acquisition unit 102 is not stored in the storage unit 23, transmits the authentication information that has been newly entered by the user to at least one authentication apparatus, and requests user authentication. The second user identifier acquisition unit 106 is an example of a second user identifier acquisition unit that acquires a second user identifier of the user that is stored in the authentication apparatus that performed user authentication in response to the request of the second authentication request unit 105. The storage controller 107, when the second user identifier for identifying the user that has been authenticated by the authentication apparatus is not stored in the storage unit 23, stores the second user identifier that has been acquired by the first user identifier acquisition unit 102 and the new first user identifier so as to correspond with each other, and when the second user identifier has been acquired by the second user identifier acquisition unit 106, specifies the first user identifier that is stored in the storage unit 23 corresponding with that second user identifier that has been acquired, and stores that specified first user identifier and the second user identifier that has been acquired by the first user identifier acquisition unit 102 so as to correspond with each other in the storage unit 23.

2. Operation

Next is a description of operation of the authentication system 1. As described above, the authentication system 1 is provided with five authentication apparatuses, these being the authentication server apparatuses 10A to 10C, the fingerprint authentication apparatus 26, and the IC card authentication apparatus 27, as authentication apparatuses that authenticate a user of the image forming apparatus 20. When a user that uses the image forming apparatus 20 selects a desired authentication apparatus from among these authentication apparatuses, and obtains authentication of the selected authentication apparatus, this user is considered to be a valid user also of the image forming apparatus 20, and therefore is allowed to use the image forming apparatus 20.

2-1. User Authentication Processing

Figure 12:
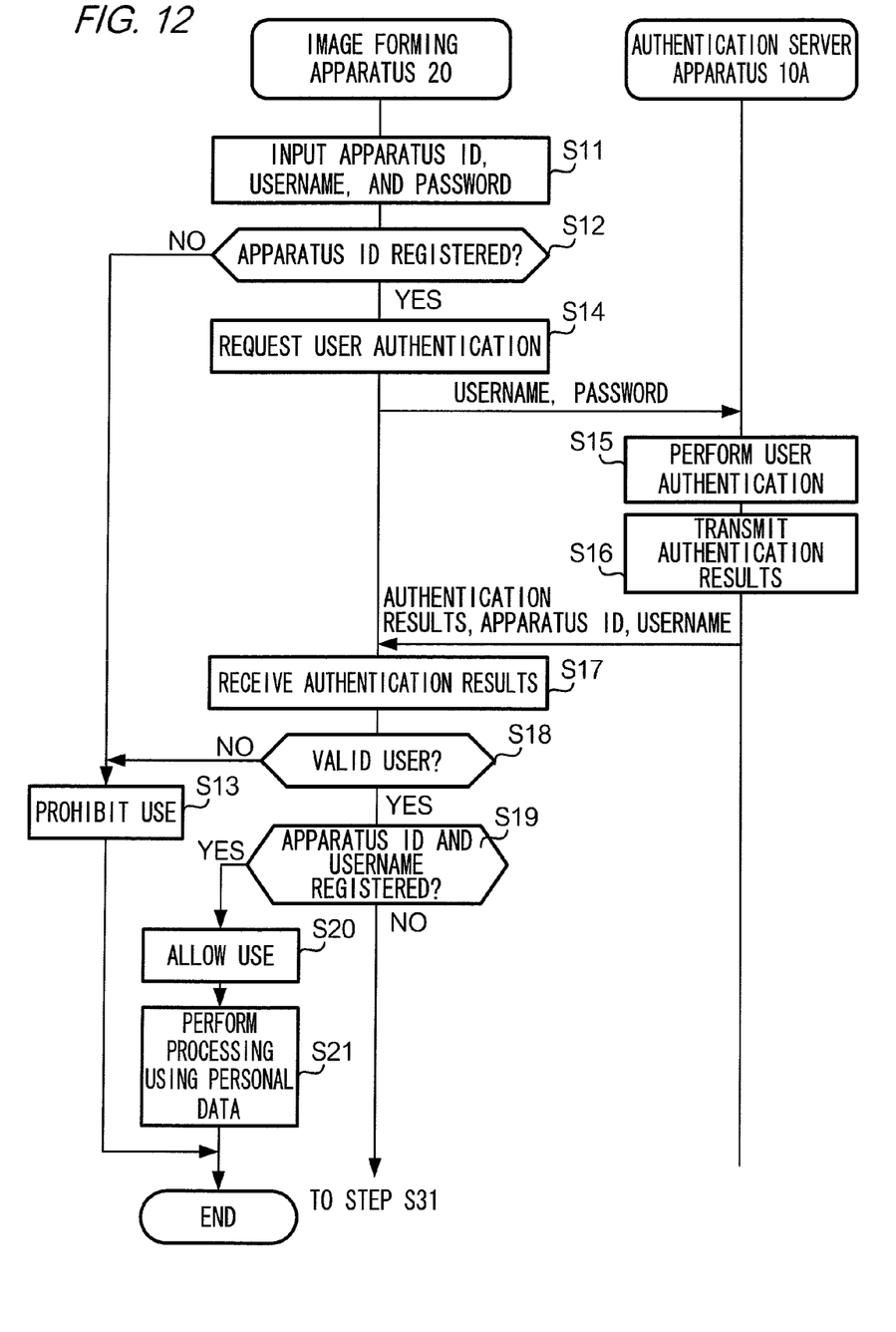
FIG. 12 is a sequence diagram that shows user authentication processing of the authentication system.

FIG. 12 is a sequence diagram that shows user authentication processing that authenticates a user that uses the image forming apparatus 20. First, the user operates the display operation unit 24 of the image forming apparatus 20 to input the apparatus ID of the authentication apparatus to be used for user authentication, and the user's own authentication information stored on that authentication apparatus. Here, a case is assumed in which the apparatus ID 'ServA' of the authentication server apparatus 10A, and the username 'fuji' and password 'abcdef', have been input.

When the apparatus ID 'ServA', the username 'fuji', and the password 'abcdef' are input by operation of the display operation unit 24 (Step Sit), the controller 21 first determines whether or not the apparatus ID that has been input is registered in the user management table T1 of the storage unit 23 (Step S12). This is done in order to prevent user authentication from being performed using an authentication apparatus that has been setup by the user without permission. That is, the controller 21 is an example of a designation receiving unit that receives designation of the authentication apparatus that will perform user authentication. For example, when the apparatus ID that has been input is not included in the user management table T1, the controller 21 determines that this apparatus ID is not registered in the user management table T1 (Step S12: NO). In this case, the controller 21 prohibits use of the image forming apparatus 20 by the user with the username that was input in Step S11 (Step S13), and ends the user authentication processing. That is, when the apparatus identifier of the authentication apparatus that received designation as the authentication apparatus that will perform user authentication is not stored in the storage unit 23, the controller 21 does not make a request to that authentication apparatus for user authentication. When use of the image forming apparatus 20 is prohibited, the display operation unit 24 does not receive operation to instruct processing, so the user cannot use the image forming apparatus 20.

On the other hand, in this example, the apparatus ID 'ServA' that has been input by the user is included in the user management table T1 shown in FIG. 9, so the controller 21 determines that this apparatus ID is registered in the user management table T1 (Step S12: YES). In this case, the controller 21 uses the communications unit 22 to transmit the username 'fuji' and the password 'abcdef' that were input in Step S11 to the authentication server apparatus 10A with the apparatus ID 'ServA' that was input in Step S11, and requests user authentication (Step S14). At this time, the username is used as the second user identifier, and the username and password are used as authentication information. That is, when the apparatus identifier of the authentication apparatus that received designation as the authentication apparatus that will perform user authentication is stored in the storage unit 23, the controller 21 transmits authentication information that includes the second user identifier that has been input by the user to that authentication apparatus, and makes a request to that authentication apparatus for user authentication.

When user authentication is requested from the image forming apparatus 20, a CPU 11A of the authentication server apparatus 10A performs user authentication by comparing the username 'fuji' and the password 'abcdef' that have been transmitted from the image forming apparatus 20 to the 'username' and the 'password' included in the authentication table TA of the storage unit 14A (Step S15). That is, the CPU 11A is an example of an authentication unit that performs user authentication using the authentication information that has been transmitted from the image forming apparatus 20. Next, the CPU 11A uses the communications unit 13 to transmit authentication results that indicate either success or failure of user authentication to the image forming apparatus 20 (Step S16). For example, when the username 'fuji' and the password 'abcdef' that have been transmitted from the image forming apparatus 20 does not match the 'username' and the 'password' included in the authentication table TA, the CPU 11A transmits authentication results that indicate failure of user authentication to the image forming apparatus 20. On the other hand, when the username 'fuji' and the password 'abcdef' that have been transmitted from the image forming apparatus 20 match the 'username' and the 'password' included in the authentication table TA, the CPU 11A transmits authentication results that indicate success of user authentication, and also the apparatus ID stored in the storage unit 14A and the username that was used for user authentication, to the image forming apparatus 20. That is, when the user authentication performed in above Step S15 failed, the communications unit 13 transmits authentication results indicating that authentication failed to the image forming apparatus 20, and when the user authentication succeeded, transmits authentication results indicating that authentication succeeded, and the second user identifier for identifying that user that is stored in the storage unit 14, to the image forming apparatus 20. In this example, the username 'fuji' and the password 'abcdef' are included in the authentication table TA shown in FIG. 3A, so authentication results that indicate success of user authentication, the apparatus ID 'ServA' that is stored in the storage unit 14A, and the username 'fuji' that was used for user authentication are transmitted.

When the authentication results are transmitted, the controller 21 of the image forming apparatus 20 receives these authentication results with the communications unit 22 (Step S17). In this example, in addition to authentication results that indicate success of user authentication, the apparatus ID 'ServA' and the username 'fuji' are received. That is, in a case where the user authentication by the authentication apparatus succeeded, the controller 21 acquires the second user identifier of that user that is stored in that authentication apparatus. Next, based on the received authentication results, the controller 21 determines whether or not the user that input the username 'fuji' and the password 'abcdef' in Step S11 is a valid user (Step S18). For example, when the received authentication results indicate failure of user authentication, the controller 21 determines that the user is not valid (Step S18: NO). In this case, advancing to above Step S13, the controller 21 prohibits use of the image forming apparatus 20 by the user with the username that was input in Step S11, and ends the user authentication processing.

On the other hand, as in this example, when the received authentication results indicate success of user authentication, the controller 21 determines that the user is valid (Step S18: YES). In this case, the controller 21 determines whether or not the apparatus ID 'ServA' and the username 'fuji' that were received in above Step S17 are registered in the user management table T1 of the storage unit 23 (Step S19). In this example, the authentication recipient apparatus ID 'ServA' and the authentication recipient username 'fuji' are included in the user management table T1 shown in FIG. 9, so the controller 21 determines that the received apparatus ID and username are registered in the user management table T1 (Step S19: YES). In this case, the controller 21 specifies the user ID that corresponds with that apparatus ID and username in the user management table T1 of the storage unit 23, and allows the user with the specified user ID to use the image forming apparatus 20 (Step S20). This user ID is used as the first user identifier. That is, the controller 21 specifies the first user identifier that is stored in the storage unit 23 corresponding with the second user identifier that was acquired in above Step S17, and allows the user identified by the specified first user identifier to use the image forming apparatus 20. In this example, in the user management table T1 shown in FIG. 9, the user ID '007' corresponding with the authentication recipient apparatus ID 'ServA' and the authentication recipient username 'fuji' is specified, and the user with the user ID '007' is allowed to use the image forming apparatus 20. When the user ID '007' of the user is specified in this way, subsequent processing is handled as processing that has been performed by the user having that user ID.

Next, the controller 21 performs processing using the personal data corresponding with the specified user ID in the user data U of the storage unit 23 (Step S21). That is, in a case where use of the image forming apparatus 20 has been allowed in Step S20, processing is performed using data that is stored in the storage unit 23 corresponding with the first user identifier that has been specified in Step S20. In this example, processing is performed using the personal data that corresponds with the user ID '007' in the user data U shown in FIG. 10. This may be processing that, for example, based on settings indicated by the screen customizing information 'CU007', displays a screen that has been customized by the user with the user ID '007' in the display operation unit 24, or may be processing that, creates operation history information based on the contents of operation of the display operation unit 24, and adds that operation history information to the operation history information 'OP007'. Alternatively, this may be processing that displays the address book information 'AD007' that has been created by the user with the user ID '007' in the display operation unit 24, or may be processing that causes the image forming unit 25 to form an image according to the image data 'IM007-1' that has been stored by the user with the user ID '007'.

Here, it is assumed that the apparatus ID 'ServA', the username 'tanaka', and the password 'ghijk' have been input in above Step Sit. In this case, as in above Steps S11 to S18, authentication of the user with the username 'tanaka' is performed by the authentication server apparatus 10A. At this time, in above Step S16, authentication results indicating that user authentication was successful, the apparatus ID 'ServA' stored in the storage unit 14A of the authentication server apparatus 10A, and the username 'tanaka' used for user authentication are transmitted to the image forming apparatus 20, so in the following Step S17, this information is received. When it is determined that the user is valid in Step S18, processing advances to Step S19. In Step S19, the authentication recipient apparatus ID 'ServA' and the authentication recipient username 'tanaka' are not included in the user management table T1 shown in FIG. 9, so it is determined that the apparatus ID and username received in Step S17 are not registered in the user management table T1 (Step S19: NO). When, in this way, the apparatus ID and username received in Step S17 are not registered in the user management table T1, registration processing is performed that registers this apparatus ID and username in the user management table T1.

2-2. Registration Processing

Figure 13:
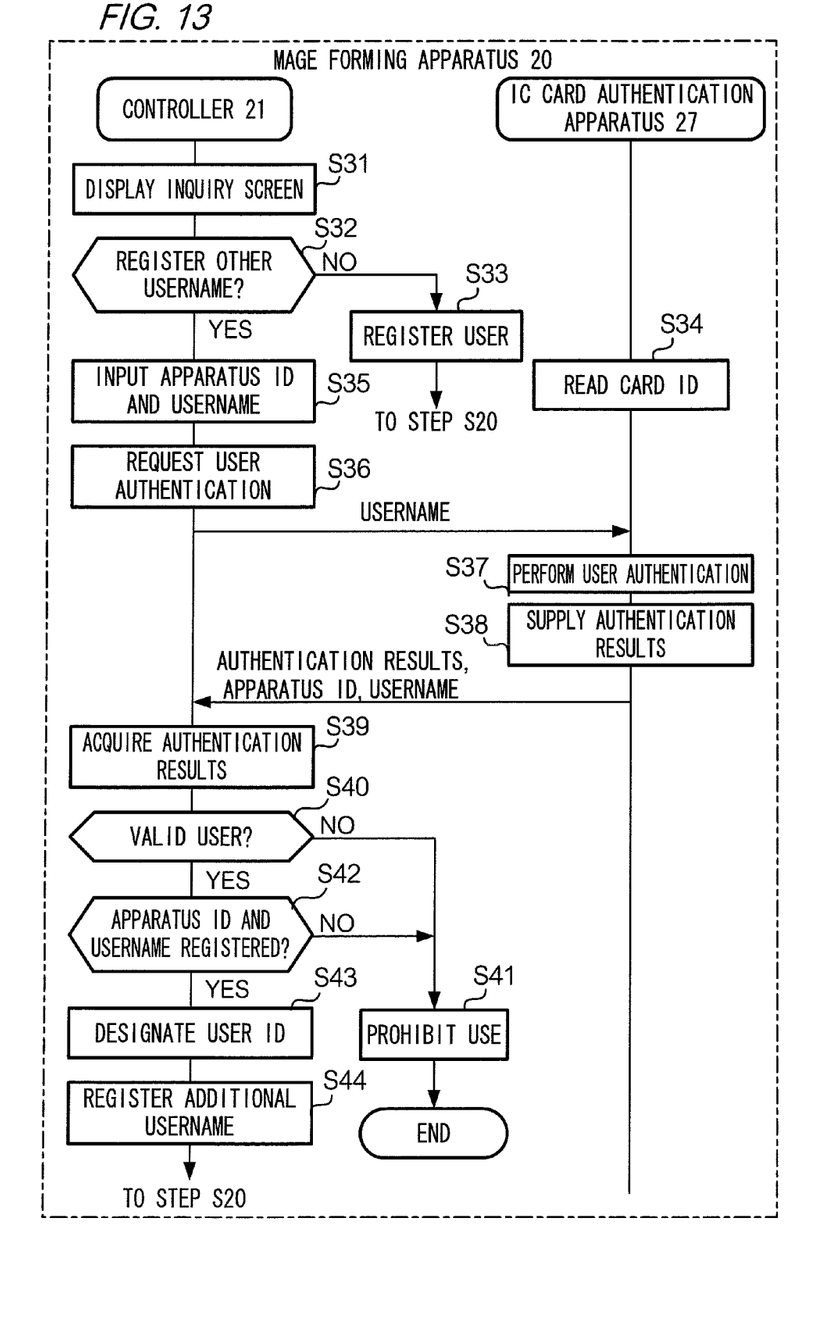
FIG. 13 is a sequence diagram that shows registration processing of the authentication system.

FIG. 13 is a sequence diagram that shows this registration processing. When it is determined in the above Step S19 that the apparatus ID and username are not registered in the user management table T1, the controller 21 displays an inquiry screen for inquiring as to whether another username is registered in the user management table T1 in the display operation unit 24 (Step S31). Here, 'another username' means a username of a user other than the username received in Step S17. In this inquiry screen, a 'yes' soft button that indicates that another username is registered and a 'no' soft button that indicates that another username is not registered are disposed. For example, when the 'no' soft button is pressed by the user, a determination is made that another username is not registered in the user management table T1 (Step S32: NO).

Figure 14:
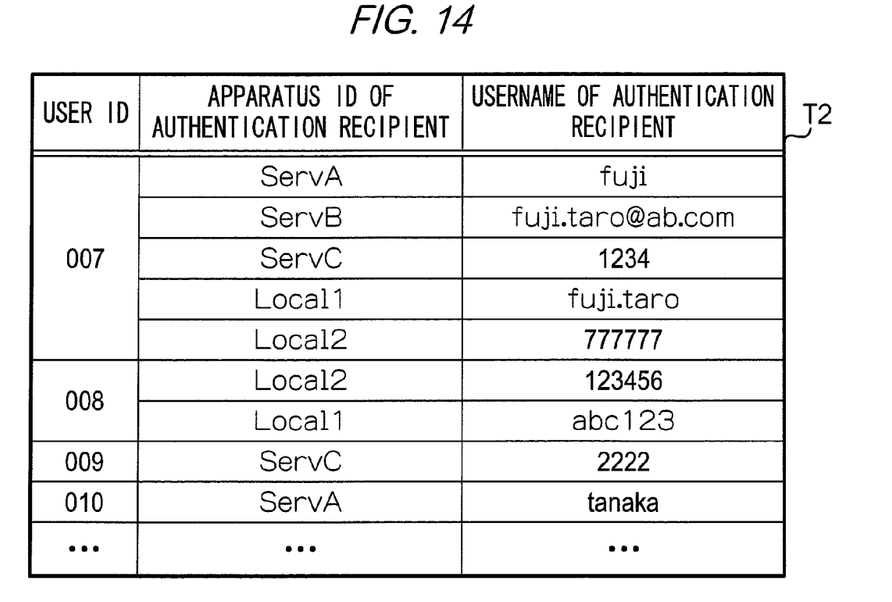
FIG. 14 shows the user management table after user registration has been performed.

In this case, the controller 21 performs user registration by adding a new user ID, and the apparatus ID and username received in Step S17, to the user management table T1 of the storage unit 23 (Step S33). That is, when the second user identifier that has been acquired in Step S17 is not stored in the storage unit 23, the controller 21 stores that second user identifier that has been acquired and the new first user identifier so as to correspond with each other in the storage unit 23. FIG. 14 shows a user management table T2 after user registration of the username 'tanaka' has been performed. As shown in FIG. 14, a new user ID '010', the authentication recipient apparatus ID 'ServA', and the authentication recipient username 'tanaka' are described so as to correspond with each other in the user management table T2. At this time, the username 'tanaka' may also be added to the user data U of the storage unit 23.

When this registration of the username 'tanaka' is completed, the controller 21 advances to the processing of above-described Step S20. At this time, in Step S20, in the user management table T2 shown in FIG. 14, the user ID '010' corresponding with the apparatus ID 'ServA' and the username 'tanaka' is specified, and the user with the user ID '010' is allowed to use the image forming apparatus 20. Subsequent processing is handled as processing that has been performed by the user having the user ID '010'. Next, in Step S21, processing is performed using the personal data that corresponds with the user ID '010' in the user data U shown in FIG. 10.

On the other hand, when the 'yes' soft button of the inquiry screen is pressed by the user, the controller 21 determines that another username is registered in the user management table T1 (Step S32: YES). In this case, the user operates the display operation unit 24 of the image forming apparatus 20 to input the apparatus ID of the authentication apparatus to be used for user authentication using another username, and the user's own authentication information stored on that authentication apparatus. Here, it is assumed that the apparatus ID 'Local 2' of the IC card authentication apparatus 27 and the username '123456' have been input. At this time, the user further brings the IC card that the user will use near the communications unit 27c of the IC card authentication apparatus 27, and causes the 'card ID' stored on the IC card to be read. Here, it is assumed that the card ID '7788' is stored on the IC card.

When the IC card is brought near by the user, the controller 27a of the IC card authentication apparatus 27 reads the card ID '7788' stored on that IC card with the communications unit 27c (Step S34). Also, when the apparatus ID 'Local2' and the username '123456' are input by operation of the display operation unit 24 (Step S35), the controller 21 of the image forming apparatus 20 supplies the username '123456' that has been input to the IC card authentication apparatus 27 having this apparatus ID 'Local2', and makes a request to that authentication apparatus for user authentication (Step S36). That is, when the second user identifier that has been acquired in Step S17 is not stored in the storage unit 23, the controller 21 transmits the authentication information that has been newly input by the user to at least one authentication apparatus, and makes a request to that authentication apparatus for user authentication.

When user authentication is requested by the controller 21, the controller 27a of the IC card authentication apparatus 27 performs user authentication by comparing the username '123456' that has been supplied from the controller 21 and the card ID '7788' that has been read from the IC card in above Step S34 to the 'username' and the 'card ID' included in the IC card authentication table TF of the memory 27b (Step S37). That is, the controller 27a is an example of an authentication unit that performs user authentication using the authentication information that has been transmitted from the controller 21. Next, the controller 27a supplies authentication results that indicate either success or failure of user authentication to the controller 21 (Step S38). For example, when the username that has been supplied from the controller 21 and the card ID that has been read from the IC card do not match the 'username' and the 'card ID' included in the IC card authentication table TF of the memory 27b, the controller 27a supplies authentication results that indicate failure of user authentication to the controller 21. On the other hand, when the username that has been supplied from the controller 21 and the card ID that has been read from the IC card match the 'username' and the 'card ID' included in the IC card authentication table TF of the memory 27b, the controller 27a supplies authentication results that indicate success of user authentication, and also the apparatus ID stored in the memory 27b and the username that was used for user authentication, to the controller 21. That is, the controller 27a is an example of a transmission unit that, when the user authentication failed, transmits authentication results indicating that authentication failed to the controller 21a, and when the user authentication succeeded, transmits authentication results indicating that authentication succeeded, and the second user identifier for identifying that user that is stored in the memory 27b, to the controller 21. In this example, the username '123456' and the card ID '7788' are included in the fingerprint authentication table TF shown in FIG. 8, so authentication results that indicate success of user authentication, the apparatus ID 'Local2' that is stored in the memory 27b, and the username '123456' that was used for user authentication are supplied to the controller 21.

When the authentication results are supplied from the IC card authentication apparatus 27, the controller 21 acquires these authentication results (Step S39). In this example, in addition to authentication results that indicate success of user authentication, the authentication ID 'Local2' and the username '123456' are acquired. That is, in a case where the user authentication by the authentication apparatus performed in response to the user authentication request in above Step S36 succeeded, the controller 21 acquires the second user identifier of that user that is stored in that authentication apparatus. Next, based on the acquired authentication results, the controller 21 determines whether or not the user that input the username '123456' in above Step S35 is a valid user (Step S40). For example, when the acquired authentication results indicate that user authentication failed, the controller 21 determines that the user is not valid (Step S40: NO), and as in above Step S13, prohibits use of the image forming apparatus 20 by the user with the username that was input in Step S11 (Step S41), and ends the registration processing.

On the other hand, as in this example, when the acquired authentication results indicate success of user authentication, the controller 21 determines that the user is valid (Step S40: YES). In this case, the controller 21 determines whether or not the apparatus ID and username acquired in Step S39 are registered in the user management table T1 of the storage unit 23 (Step S42). For example, when the acquired apparatus ID and username are not included in the user management table T1, the controller 21 determines that this apparatus ID and username are not registered in the user management table T1 (Step S42: NO). In this case, the controller 21 advances to above Step S41, prohibits use of the image forming apparatus 20 by the user with the username that was input in Step S11, and ends the registration processing. On the other hand, in this example, the authentication recipient apparatus ID 'Local2' and the authentication recipient username '123456' are included in the user management table T1 shown in FIG. 9, so the controller 21 determines that the acquired apparatus ID and username are registered in the user management table T1 (Step S42: YES). In this case, the controller 21 specifies the user ID that corresponds with that apparatus ID and username in the user management table T1 of the storage unit 23 (Step S43). In this example, in the user management table T1 shown in FIG. 9, a user ID '008' corresponding with the authentication recipient apparatus ID 'Local2' and the authentication recipient username '123456' is specified.

Figure 15:
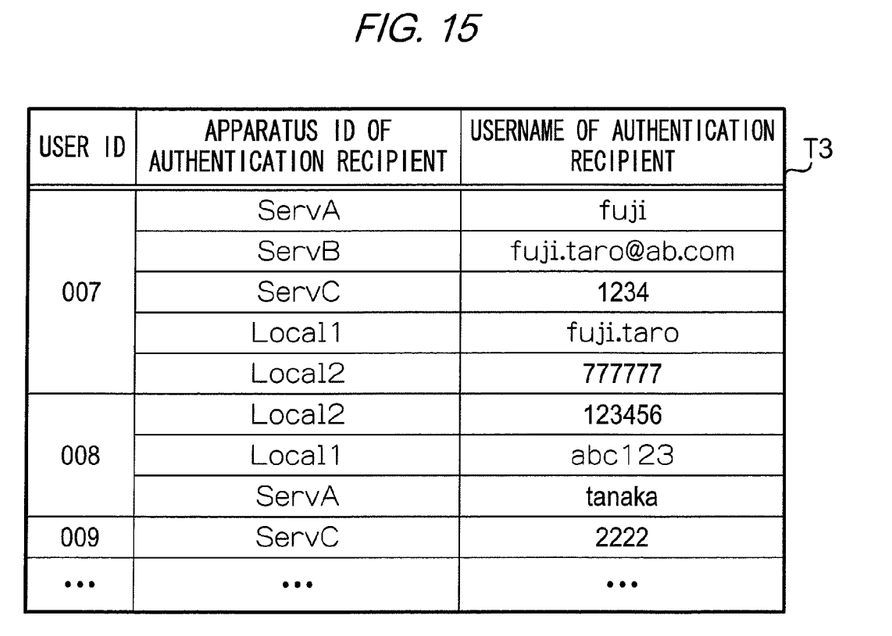
FIG. 15 shows the user management table after an additional user name has been registered.

Next, the controller 21 performs additional username registration by adding the apparatus ID and username that were received in Step S17, so as to correspond with the user ID specified in Step S43, to the user management table T1 (Step S44). That is, when the second user identifier has been acquired in above Step S39, the controller 21 specifies the first user identifier that is stored in the storage unit 23 corresponding with that second user identifier that was acquired, and stores that specified first user identifier and the second user identifier that was acquired in above Step S17 so as to correspond with each other in the storage unit 23. FIG. 15 shows a user management table T3 after additional registration of the username 'tanaka' has been performed. As shown in FIG. 15, the authentication recipient apparatus ID 'ServA' and the authentication recipient username 'tanaka' are added, so as to correspond with the user ID '008' specified in Step S43, to the user management table T3.

When this registration of the username 'tanaka' is completed in this manner, the controller 21 advances to the processing of above-described Step S20. At this time, in Step S20, in the user management table T3 shown in FIG. 15, the user ID '008' corresponding with the apparatus ID 'ServA' and the username 'tanaka' is specified, and the user with the user ID '008' is allowed to use the image forming apparatus 20. Subsequent processing is handled as processing that has been performed by the user having the user ID '008'. Next, in Step S21, processing is performed using the personal data that corresponds with the user ID '008' in the user data U shown in FIG. 10.

As described above, in the authentication system 1, authentication of a user of the image forming apparatus 20 is performed using any of the authentication server apparatuses 10A to 10C, the fingerprint authentication apparatus 26, and the IC card authentication apparatus 27. Also, because a 'user ID' and an 'apparatus ID' of an authentication recipient as shown in FIG. 9 and the like correspond with each other in the user management table T1, the user that uses the image forming apparatus 20 is specified regardless of which authentication apparatus was used for authentication. Also, in the authentication system 1, user registration that adds a new username to the user management table T1 is performed by the user that will use the image forming apparatus 20, and not by a manager who manages the image forming apparatus 20. When user registration is performed by the user, there is a risk that unauthorized user registration will be performed if that user is a third party with malicious intent, but in the exemplary embodiment described above, only a valid user that has been authenticated by any authentication apparatus among the authentication server apparatuses 10A to 10C, the fingerprint authentication apparatus 26, and the IC card authentication apparatus 27 is capable of performing user registration, so security is ensured even when user registration is performed by the user.

3. Modified Examples

Above was a description of an exemplary embodiment, but the content of that exemplary embodiment can be modified in the manner described below. Also, the modified examples described below may be appropriately combined.

3-1. Modified Example 1

In the above exemplary embodiment, the username transmitted from the authentication apparatus that performs user authentication and the username that has been input by the user are the same, but these usernames may also be different. Here is a description of an example in which user authentication is performed by the authentication server apparatus 10B. In this case, a 'first username' that is the same as the 'username' shown in FIG. 3B, and a 'second username' that differs from the 'first username', are described so as to correspond with each other in the authentication table TB of the authentication server apparatus 10B. In above Step Sit, this second username is input by the user. At this time, in above Step S16, when user authentication was successful, the first username corresponding with the second username used for user authentication in the authentication table TB is transmitted to the image forming apparatus 20. As described above, because the 'first username' is the same as the 'username' shown in FIG. 3B, processing subsequent to Step S17 is the same as the processing in the above exemplary embodiment. This is useful in a case where, for example, the authentication server apparatus 10B specifies the user using the first username and the second username. Also, the same configuration and operation as the above authentication server apparatus 10B may be adopted in the authentication server apparatuses 10A and 10C, the fingerprint authentication apparatus 26, and the IC card authentication apparatus 27. Also, with respect to the registration processing, the same operation as the above authentication server apparatus 10B may be performed by the authentication apparatus that performs user authentication.

3-2. Modified Example 2

In the above exemplary embodiment, the authentication results and the apparatus ID and username are transmitted from the authentication apparatus, but a configuration may also be adopted in which only the authentication results are transmitted, and the apparatus ID and username are not transmitted. In this case, the controller 21 of the image forming apparatus 20 stores the apparatus ID and username that have been input by the user in a memory or the like. Also, when the authentication results transmitted in response to a request for user authentication indicate that authentication was successful, the controller 21 reads and uses the stored apparatus ID and username, but when those authentication results indicate that authentication failed, the controller 21 deletes the stored apparatus ID and username. That is, in a case where the user authentication by the authentication apparatus succeeded, the controller 21 reads and acquires the second user identifier of that user that is stored in that authentication apparatus from the storage unit of that apparatus.

3-3. Modified Example 3

In the above exemplary embodiment, after user authentication has been performed by the authentication apparatus, in above Step S19 a determination is made of whether or not the apparatus ID and username transmitted from that authentication apparatus are registered in the user management table T1, but the determination in Step S19 may also be performed before user authentication is requested in above Step S14. Here, when it is determined that the apparatus ID and username are not registered in the user management table T1, first the above registration processing is performed, and then processing returns to above Step S14 and user authentication is requested. Also, as with the registration processing, the determination in above Step S42 may be performed before user authentication is requested in above Step S36.

3-4. Modified Example 4

In above Step S11 or S35, a screen may be displayed that supports operation to input the apparatus ID of the authentication apparatus that will perform user authentication and authentication information.

Figure 16:
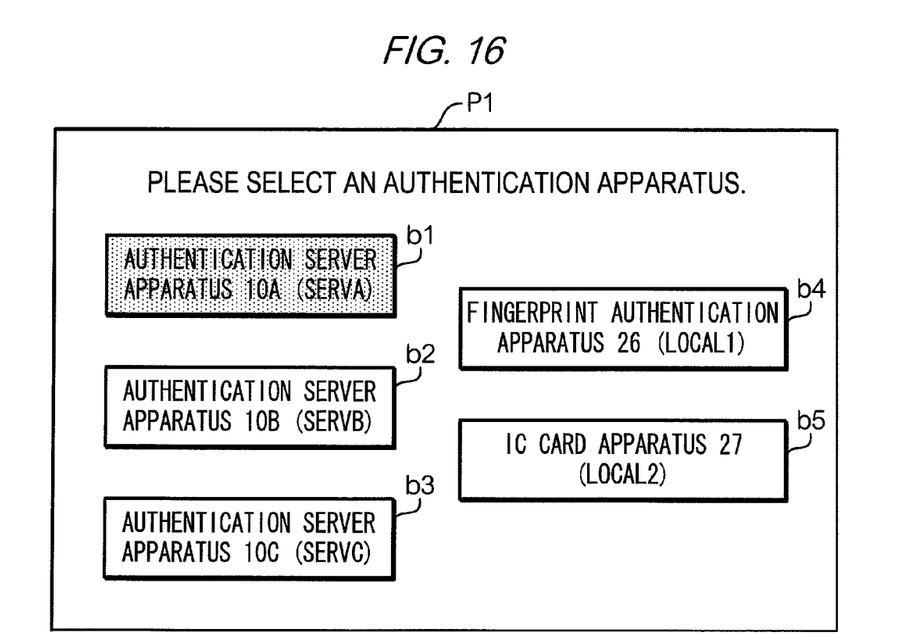
FIG. 16 shows an example of an apparatus ID selection screen displayed by the image forming apparatus according to a modified example.

FIG. 16 shows an example of an apparatus ID selection screen P1 that supports operation to input the apparatus ID of the authentication apparatus. The apparatus ID selection screen P1 is displayed in the display operation unit 24 before the processing in above Step S11 or S35 is performed. As shown in FIG. 16, soft buttons b1 to b5 for selecting the apparatus ID of the respective authentication apparatuses is disposed in the apparatus ID selection screen P1. For example, when the soft button b1 has been pressed by the user, the controller 21 of the image forming apparatus 20 receives input of 'ServA', which is the apparatus ID of the authentication server apparatus 10A. When the apparatus ID is input in this way, next, the controller 21 displays a username selection screen P2 that supports operation to input a username in the display operation unit 24.

Figure 17:
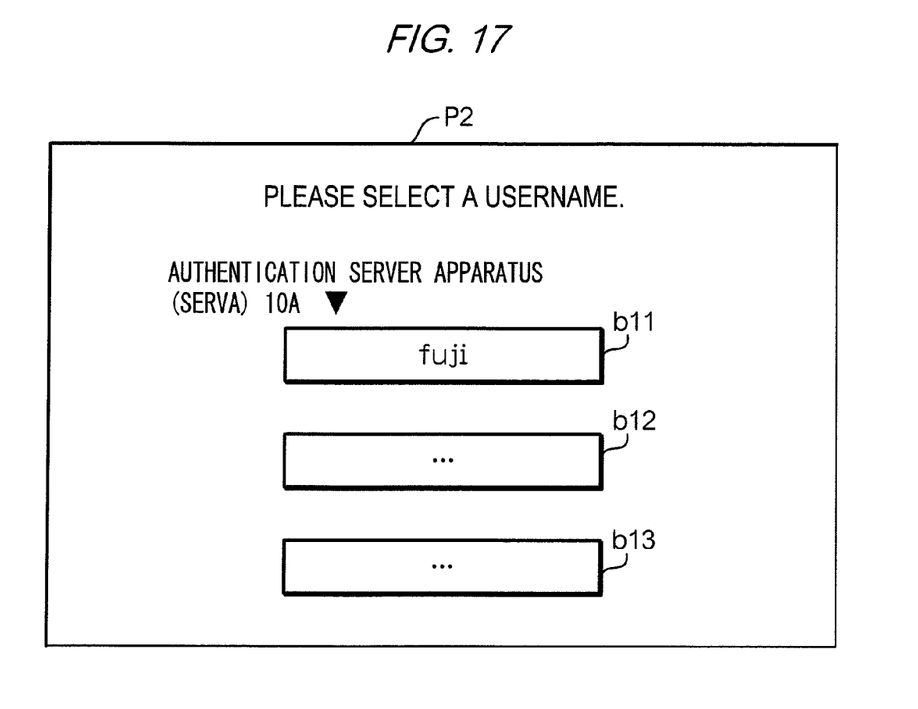
FIG. 17 shows an example of a user ID selection screen displayed by the image forming apparatus according to a modified example.

FIG. 17 shows an example of this username selection screen P2. As shown in FIG. 17, soft buttons b11, b12, and b13 for selecting the authentication recipient 'username' corresponding with the apparatus ID 'ServA' that has been input in the above apparatus ID selection screen P1, in the user management table T1 of the storage unit 23, are disposed in the username selection screen P2. For example, when the soft button bit has been pressed by the user, the controller 21 of the image forming apparatus 20 receives input of the username 'fuji'.

Also, a configuration may be adopted in which before the processing in above Step S11 or S35 is performed, the controller 21 displays, in the display operation unit 24, a list of each authentication recipient 'apparatus ID' and each authentication recipient 'username' that is included in the user management table T1 of the storage unit 23. In this case, the controller 21 receives the apparatus ID and username that have been selected from among the apparatus IDs and the usernames that are displayed in the display operation unit 24. That is, the controller 21 is an example of a selection receiving unit that displays the second user identifiers stored in the storage unit 23 in a display, and receives selection of a second user identifier from among the second user identifiers that are displayed. In this case, the apparatus ID input by the user is certainly included in the user management table T1, so the processing in above Step S12 is unnecessary.

Also, a configuration may be adopted in which before the processing in above Step S11 or S35 is performed, the controller 21 requests a list of the apparatus ID and stored usernames for each authentication apparatus, from each authentication apparatus, and displays the list of apparatus IDs and corresponding usernames that has been transmitted in response to that request in the display operation unit 24. In this case, the controller 21 receives the apparatus ID and username that have been selected from among the apparatus IDs and the usernames that are displayed in the display operation unit 24. That is, the controller 21 is an example of a selection receiving unit that acquires the second user identifiers stored in the respective authentication apparatuses and displays them in a display, and receives selection of a second user identifier from among the second user identifiers that are displayed.

3-5. Modified Example 5

The user management table T1 that is stored in the storage unit 23 of the image forming apparatus 20 may be rewritten according to operation by a user. In this case, the user first operates the display operation unit 24 to display the user management table T1 of the storage unit 23 in the display operation unit 24. Next, the user operates the display operation unit 24 to instruct rewriting of the contents of the displayed user management table T1. For example, in the user management table T1 shown in FIG. 9, the user ID '007' corresponds with the authentication recipient apparatus ID 'Local2' and the authentication recipient username '777777'. When this corresponding relationship is incorrect, the user operates the display operation unit 24 to instruct, for example, correspondence of the user ID '009' with the authentication recipient apparatus ID 'Local2' and the authentication recipient username '777777'. In accordance with this instruction, the controller 21 rewrites the contents of the user management table T1 such that the user ID '009' corresponds with the authentication recipient apparatus ID 'Local2' and the authentication recipient username '777777'. Likewise, the user may operate the display operation unit 24 to instruct deletion of an unnecessary record. In this case, according to this instruction, the controller 21 deletes a designated record from the user management table T1.

Also, multiple user IDs may be consolidated in the user management table T1. For example, a case is presumed in which a manager that manages the image forming apparatus 20 operates the display operation unit 24 to consolidate the user ID '008' and the user ID '009' in the user management table T1 shown in FIG. 9 into the user ID '008'. In this case, the controller 21 changes the correspondence in the user management table T1 such that the authentication recipient apparatus ID 'ServC' and the authentication recipient username '2222' that corresponded with the user ID '009' correspond with the user ID '008'. That is, the controller 21 is an example of a correspondence changing unit. Then, the controller 21 deletes the user ID '009' from the user management table T1. Also, the user ID after consolidating multiple user IDs is not necessarily some user ID prior to consolidation, and may be a new user ID.

3-6. Modified Example 6

In the above exemplary embodiment, when additional registration of a username is performed in the registration processing, user authentication has been performed by an authentication apparatus, but a configuration may also be adopted in which this user authentication is not necessarily performed. This is because the user who performs registration processing has been authenticated as a valid user in the user authentication processing, so there is little possibility that an invalid username will be added even if user authentication is not performed again. In this case, the apparatus ID and username that have been input in Step S11 are additionally registered as-is in the user management table T1.

3-7. Modified Example 7

In the above exemplary embodiment, the user management table T1 is used to determine whether or not the apparatus ID that has been input by the user is the apparatus ID of a valid authentication apparatus, but this is not a limitation. For example, a configuration may be adopted in which an authentication apparatus table in which the apparatus IDs of valid authentication apparatuses have been described is stored in the storage unit 23, and the determination is performed using this authentication apparatus table. The user management table T1 described above includes only the apparatus IDs of authentication apparatuses that have been used by the user of the image forming apparatus 20, but this authentication apparatus table can also include other apparatus IDs. Accordingly, if the determination is made using the authentication apparatus table, a valid authentication apparatuses that have not been used even once by the user of the image forming apparatus 20 can also be used as the authentication apparatus that performs user authentication.

3-8. Modified Example 8

In the above exemplary embodiment, an apparatus ID, username, and password have been input by operation of the display operation unit 24 by the user, but this is not a limitation. For example, in a case where an unshown information processing terminal is connected to the image forming apparatus 20 via a network, the user may input an apparatus ID, username, and password by operating this information processing terminal. In this case, the information processing terminal transmits information that has been input to the image forming apparatus 20 using a communications unit, and the controller 21 of the image forming apparatus 20 receives this information that has been transmitted from the information processing terminal using the communications unit 22. Also, the controller 21, in above Step S14, transmits the received apparatus ID, username, and password to the authentication apparatus, and requests user authentication by that authentication apparatus.

3-9. Modified Example 9

In the above exemplary embodiment, as an example of the information processing apparatus of the present invention, the configuration in the image forming apparatus 20, with the exception of the fingerprint authentication apparatus 26 and the IC card authentication apparatus 27, is described, but this is not a limitation. For example, the information processing apparatus may be a personal computer apparatus. The information processing apparatus of the present invention, in other words, is an apparatus that is used by a user, and may store a first user identifier and a second user identifier so as to correspond with each other.

3-10. Modified Example 10

In the above exemplary embodiment, an example is described in which the registration processing shown in FIG. 13 is performed by a user who uses the image forming apparatus 20, but this is not a limitation. For example, the registration processing may be performed by a manager who manages the image forming apparatus 20.

3-11. Modified Example 11

In the above exemplary embodiment, the processing of the controller 26*a* of the fingerprint authentication apparatus 26 or the controller 27*a* of the IC card authentication apparatus 27 may be performed by the CPU of the controller 21 according to a program. In this case, the fingerprint authentication table TE stored in the memory 26*b* of the fingerprint authentication apparatus 26 and the IC card authentication table TF stored in the memory 27*b* of the IC card authentication apparatus 27 may be stored in the storage unit 23. Also, each program that is executed by the CPU II of the authentication server apparatus 10, and by the CPU of the controller 21 of the image forming apparatus 20, can be provided stored on a recording medium readable by a computer, such as a magnetic recording medium such as a magnetic tape or a magnetic disk, an optical recording medium such as an optical disk, a magneto-optical recording medium, or a semiconductor memory. Also, these programs can be downloaded via a network such as the Internet.

What is claimed is:

1. An information processing apparatus, comprising:
    a correspondence storage unit that stores a first user identifier that identifies respective users in the information processing apparatus, an apparatus identifier that identifies respective authentication apparatuses, and a second user identifier that identifies the users in each authentication apparatus, so as to correspond with each other;
    a first authentication request unit that transmits authentication information based on an instruction that has been input by a user to at least one of the authentication apparatuses and requests authentication to authenticate a user in the information processing apparatus, the authentication information including the second user identifier corresponding to the authentication apparatus;
    a first user identifier acquisition unit that, when authentication of the user by the authentication apparatus has been successful, acquires the second user identifier of that user that is stored in that authentication apparatus; and
    a use allowing unit that specifies the first user identifier stored in the correspondence storage unit by referring to the second user identifier that has been acquired by the first user identifier acquisition unit and the apparatus identifier that identifies the destination authentication apparatus of the authentication information, and allows the user that is identified by the specified first user identifier to use the information processing apparatus.

2. The information processing apparatus according to claim 1, further comprising
    a storage controller that, when the second user identifier acquired by the first user identifier acquisition unit is not stored in the correspondence storage unit, stores the acquired second user identifier and a new first user identifier so as to correspond with each other in the correspondence storage unit.

3. The information processing apparatus according to claim 2, further comprising
    a second user identifier acquisition unit that, when the second user identifier that has been acquired by the first user identifier acquisition unit is not stored in the correspondence storage unit, acquires a second user identifier of the user that is stored in an authentication apparatus other than the authentication apparatus that performed authentication of the user,
    wherein, when the second user identifier is acquired by the first user identifier acquisition unit, the storage controller is configured to store the second user identifier and the new first user identifier so as to correspond with each other in the correspondence storage unit, and
    when the second user identifier has been acquired by the second user identifier acquisition unit, specifies a first user identifier that is stored corresponding with the acquired second user identifier in the correspondence storage unit, the storage controller is configured to store the specified first user identifier and the second user identifier acquired by the first user identifier acquisition unit so as to correspond with each other in the correspondence storage unit.

4. The information processing apparatus according to claim 3, further comprising
    a second authentication request unit that, when the second user identifier that has been acquired by the first user identifier acquisition unit is not stored in the correspondence storage unit, transmits authentication information that has been newly input by a user to at least one of the authentication apparatuses and requests authentication of the user, wherein, when authentication of the user by the authentication apparatus that was performed in response to the request of the second authentication request unit was successful, the second user identifier acquisition unit is configured to acquire the second user identifier of the user that is stored in that authentication apparatus.

5. The information processing apparatus according to claim 4, further comprising a selection receiving unit that displays the second user identifiers stored in the correspondence storage unit in a display, and receives selection of a second user identifier from among the second user identifiers that are displayed, wherein the second authentication request unit is configured to transmit the authentication information that includes the second user identifier whose selection was received by the selection receiving unit to at least one of the authentication apparatuses, and requests authentication of the user.

6. The information processing apparatus according to claim 4, further comprising a selection receiving unit that acquires the second user identifiers stored in the respective authentication apparatuses and displays them in a display, and receives selection of a second user identifier from among the second user identifiers that are displayed, wherein the second authentication request unit is configured to transmit the authentication information that includes the second user identifier whose selection was received by the selection receiving unit to at least one of the authentication apparatuses, and requests authentication of the user.

7. The information processing apparatus according to claim 1, further comprising:

a data storage unit that stores the first user identifier and data of a user identified by the first user identifier so as to correspond with each other; and a processing unit that, when usage of the information processing apparatus has been allowed by the usage allowing unit, performs processing using data stored corresponding with the specified first user identifier in the data storage unit.

8. The information processing apparatus according to claim 1, further comprising a correspondence changing unit that, when a plurality of first user identifiers are designated from among the first user identifiers stored in the correspondence storage unit, and the plurality of designated first user identifiers are instructed to be consolidated, changes the correspondence by the correspondence storage unit such that the second user identifiers stored corresponding with the respective designated first user identifiers, and any of the plurality of designated first user identifiers, correspond with each other.

9. The information processing apparatus according to claim 1, further comprising:

a designation receiving unit that receives a designation of an authentication apparatus that performs authentication of the user;

wherein, when the apparatus identifier of the authentication apparatus for which the designation receiving unit received designation is stored in the correspondence storage unit, the first authentication request unit is configured to transmit authentication information that has been input by a user to that authentication apparatus and requests authentication of the user by that authentication apparatus, and when the apparatus identifier of the authentication apparatus for which the designation receiving unit received designation is not stored in the correspondence storage unit, the first authentication request unit is configured so as not to request authentication of the user by that authentication apparatus.

10. An authentication system comprising a plurality of authentication apparatuses and an information processing apparatus, each authentication apparatus comprising:

a user identifier storage unit that stores a second user identifier that identifies respective users in the information processing apparatus;

an authentication unit that performs user authentication using authentication information that has been transmitted from the information processing apparatus; and a transmission unit that, when the user authentication by that authentication unit fails, transmits authentication results indicating that the authentication failed to the information processing apparatus, and when the user authentication succeeds, transmits authentication results indicating that authentication succeeded, and a second user identifier that identifies the user that is stored in the user identifier storage unit, to the information processing apparatus; and the information processing apparatus comprising:

a correspondence storage unit that stores a first user identifier that identifies respective users in the information processing apparatus, an apparatus identifier that identifies respective authentication apparatuses, and a second user identifier that identifies the users in each authentication apparatus, so as to correspond with each other;

a first authentication request unit that transmits authentication information based on an instruction that has been input by a user to at least one of the authentication apparatuses and requests authentication to authenticate a user in the information processing apparatus, the authentication information including the second user identifier corresponding to the authentication apparatuses;

a user identifier acquisition unit that, when the authentication results that have been transmitted from the transmission unit of that authentication apparatus indicate that the authentication was successful, acquires the second user identifier that has been transmitted from that authentication apparatus; and a use allowing unit that specifies the first user identifier stored in the correspondence storage unit by referring to the second user identifier that has been acquired by the user identifier acquisition unit and the apparatus identifier that identifies the destination authentication apparatus of the authentication information, and allows the user that is identified by the specified first user identifier to use the information processing apparatus.

11. An information processing method, comprising:

storing, in a storage unit, a first user identifier that identifies respective users in the information processing apparatus, an apparatus identifier that identifies respective authentication apparatuses, and a second user identifier that identifies the users in each authentication apparatus, so as to correspond with each other;

transmitting authentication information based on an instruction that has been input by a user to at least one of the authentication apparatuses and requests authentication to authenticate a user in the information processing apparatus, the authentication information including the second user identifier corresponding to the authentication apparatuses;

acquiring, when authentication of the user by the authentication apparatus has been successful, the second user identifier of that user that is stored in that authentication apparatus;

specifying the first user identifier stored in the storage unit by referring to the acquired second user identifier and the apparatus identifier that identifies the destination authentication apparatus of the authentication information;

allowing the user that is identified by the specified first user identifier to use the information processing apparatus.

12. A non-transitory computer-readable storage medium storing a program causing a computer device to execute a process, the process comprising:

storing, in a storage unit, a first user identifier that identifies respective users in the information processing apparatus, an apparatus identifier that identifies respective authentication apparatuses, and second user identifiers that identifies the users in each authentication apparatus, so as to correspond with each other;

transmitting authentication information based on an instruction that has been input by a user to at least one of the authentication apparatuses and requests authentication to authenticate a user in the information processing apparatus, the authentication information including the second user identifier corresponding to the authentication apparatuses;

acquiring, when authentication of the user by the authentication apparatus has been successful, the second user identifier of that user that is stored in that authentication apparatus;

specifying the first user identifier stored in the storage unit by referring to the acquired second user identifier and the apparatus identifier that identifies tha destination authentication apparatus of the authentication information;

allowing the user that is identified by the specified first user identifier to use the information processing apparatus.

13. An information processing apparatus, comprising:

a correspondence storage unit that stores a first user identifier that identifies respective users in the information processing apparatus, an apparatus identifier that identifies respective authentication apparatuses, and a second user identifier that identifies the users in each authentication apparatus, so as to correspond with each other;

a first authentication request unit that transmits authentication information based on an instruction that has been input by a user to at least one of the authentication apparatuses and requests authentication to authenticate a user in the information processing apparatus, the authentication information including the second user identifier corresponding to the authentication apparatuses;

a use allowing unit that, when authentication of the user by the authentication apparatus has been successful, specifies the first user identifier stored in the correspondence storage unit by referring to the second user identifier and the apparatus identifier that identifies the destination authentication apparatus of the authentication information, and allows the user that is identified by the specified first user identifier to use the information processing apparatus;

a management that manages operation history of the information processing apparatus, the operation history being operated by the identified user, along with the operation history corresponding to the specified first user identifier.

* * * * *